W. B. NICHOLS.
EGG-BEATER.
No. 183,589.          Patented Oct. 24, 1876.
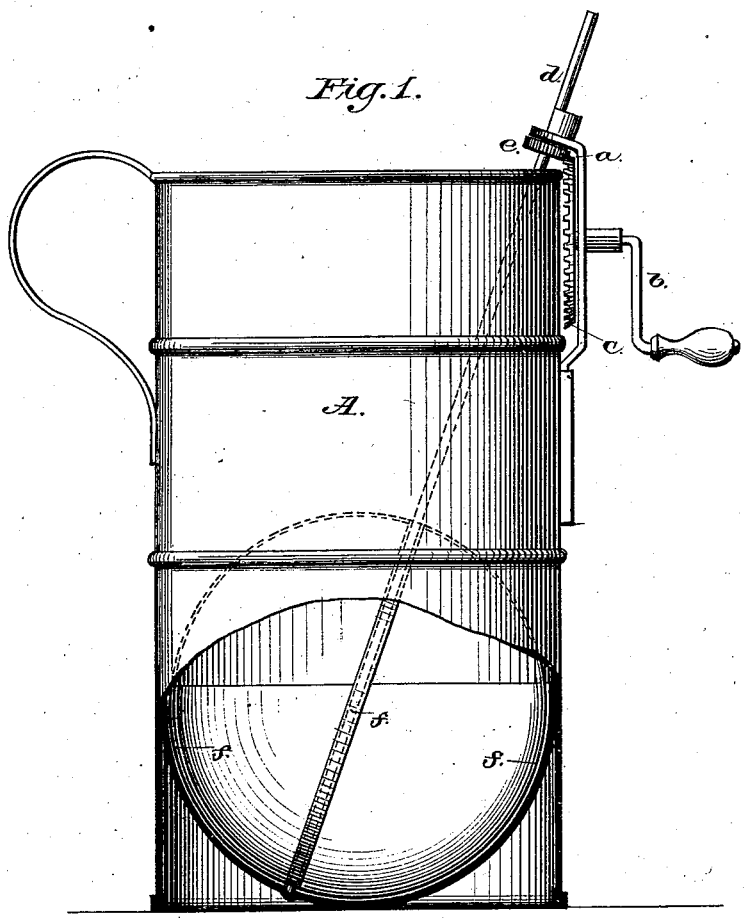
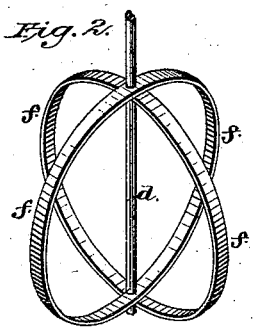
Attest:
Henry E. Manning
Wm. E. Baldwin
Inventor:
William B. Nichols
by George Perry
Attorney.

UNITED STATES PATENT OFFICE.

WILLIAM B. NICHOLS, OF SEYMOUR, CONNECTICUT.

IMPROVEMENT IN EGG-BEATERS.

Specification forming part of Letters Patent No. 183,589, dated October 24, 1876; application filed March 3, 1876.

*To all whom it may concern:*

Be it known that I, WILLIAM B. NICHOLS, of Seymour, in the county of New Haven and State of Connecticut, have invented a new and Improved Egg-Beater; and I do hereby declare the following to be a full, clear, and exact description of the invention, such as will enable others skilled in the art to which it pertains to make and use it, reference being had to the accompanying drawing, which forms a part of this specification.

My invention relates to egg-beaters; and consists in the combination of a detachable egg-beating mechanism and a cup or measure, which are hereinafter more fully set forth and their combination claimed.

In the drawing, A is a representation of the cup or measure, with a portion of the same cut away to show the lower end of the spindle $d$, the beaters $f\,f$, and also the hollow hemispherical form of its bottom. To the outside of the measure a piece is soldered of such shape as to form a space for the insertion of the standard $a$. Ribs or projections on the measure may also be made to mark its divisions, in the usual way.

The standard $a$ is made of cast metal, and of such shape as to make room between it and the measure for the wheel $c$. It is also made with projections, through which the crank $b$ and spindle $d$ pass. The bevel-gear wheel $c$ is attached to one end of the crank $b$, and turns by a single revolution the pinion $e$ and spindle $d$ eight or ten revolutions. The spindle $d$ is a straight rod, to which are fastened the pinion $e$ and beaters $f\,f$, which are circular hoops arranged on the spindle at right angles to each other. The spindle may be pivoted to the measure at its lower end, or the box or projection in which it turns may be of such length as to give it steadiness.

The egg-beater being thus constructed, the milk, or other fluid added to the eggs, can be measured and mixed in the same vessel in which the eggs are beaten, and the beating contrivance being detached from the measure, it can be used for ordinary purposes.

I claim as my invention—

The herein-described mechanism, consisting of the standard $a$, crank $b$, wheel $c$, and spindle $d$, provided with the pinion $e$ and beaters $f\,f$, in combination with the cup A, having a hollow hemispherical bottom, substantially as shown and set forth.

WILLIAM B. NICHOLS.

Witnesses:
GEORGE TERRY,
ROGER M. SHERMAN.